United States Patent
Losio et al.

(10) Patent No.: US 6,629,728 B2
(45) Date of Patent: Oct. 7, 2003

(54) SUPPORT STRUCTURE FOR A VEHICLE

(75) Inventors: Massimo Losio, S. Guiseppe Di Cassola (IT); Thomas Overthun, San Francisco, CA (US); Christopher Cowart, Boulder, CO (US)

(73) Assignee: Selle Royal, S.p.A., Pietro (IT)

(*) Notice: Subject to any disclaimer, the term of this patent is extended or adjusted under 35 U.S.C. 154(b) by 0 days.

(21) Appl. No.: 09/920,476

(22) Filed: Aug. 1, 2001

(65) Prior Publication Data

US 2002/0093229 A1 Jul. 18, 2002

(30) Foreign Application Priority Data

Aug. 8, 2000 (IT) ...................... V12000A0176

(51) Int. Cl.[7] .............. A47C 7/72; B62J 1/26; B60N 2/38
(52) U.S. Cl. ............ 297/195.1; 297/200; 297/202; 297/452.41; 297/452.42; 297/180.1; 297/180.11
(58) Field of Search .............. 297/180.1, 195.1, 297/199, 200, 214, 452.41, 452.42, DIG. 3, 180.11, 219.11, 202

(56) References Cited

U.S. PATENT DOCUMENTS

| | | | |
|---|---|---|---|
| 2,158,801 A | 1/1939 | Petterson | 297/180.11 X |
| 2,931,286 A | 4/1960 | Fry, Sr. et al. | 297/180.11 X |
| 3,514,156 A | 5/1970 | Fields | |
| 3,529,310 A | 9/1970 | Olmo | 297/180.13 |
| 4,290,644 A | 9/1981 | Hu et al. | 297/214 X |
| 4,451,083 A * | 5/1984 | Marchello | 297/195.1 |
| 4,842,332 A | 6/1989 | Conner, Jr. et al. | 297/214 |
| 5,203,607 A | 4/1993 | Landi | 297/214 |
| 5,340,192 A * | 8/1994 | Hsh | 297/180.1 X |
| 5,356,205 A * | 10/1994 | Calvert et al. | 297/452.41 X |
| 5,419,612 A * | 5/1995 | Rassekhi | 297/200 |
| 5,626,387 A * | 5/1997 | Yeh | 297/180.11 X |
| 5,725,274 A | 3/1998 | Bergmeister | 297/201 |
| 5,902,014 A | 5/1999 | Dinkel et al. | |
| 6,039,396 A | 3/2000 | Muser | 297/214 |
| 6,059,359 A | 5/2000 | Cassani | 297/195.1 |
| 6,079,775 A | 6/2000 | Lawson | 297/215.16 X |
| 6,116,683 A | 9/2000 | Maier | 297/201 X |
| 6,139,098 A | 10/2000 | Carrillo | 297/202 |
| 6,158,806 A | 12/2000 | White | 297/202 X |
| 6,186,592 B1 | 2/2001 | Orizaris et al. | 297/180.12 |
| 6,206,465 B1 | 3/2001 | Faust et al. | 297/180.14 |
| 6,322,139 B1 * | 11/2001 | Chuang | 297/452.42 X |
| 6,371,554 B1 * | 4/2002 | Ko | 297/195.1 |
| 2003/0025363 A1 * | 2/2003 | Gaggiola | 297/202 X |

FOREIGN PATENT DOCUMENTS

| | | |
|---|---|---|
| DE | 3031777 A1 | 3/1982 |
| EP | 0909677 A1 | 4/1999 |
| IT | 00232876 | 3/1993 |

\* cited by examiner

Primary Examiner—Rodney B. White
(74) Attorney, Agent, or Firm—Coudert Brothers LLP

(57) ABSTRACT

A ventilated support structure for a vehicle, such as a bicycle, comprising an upper side having a seat surface which is supported on a rigid or semi-rigid frame on which is anchored elastically flexible padding there between. The support structure may further comprise an aperture in an anterior portion of the frame. The aperture may be oriented at least partly in a direction of forward travel of the vehicle. An air distribution channel is connected to the aperture and is also connected to a plurality of air discharge openings to ventilate the seat surface.

13 Claims, 6 Drawing Sheets

SUPPORT STRUCTURE FOR A VEHICLE

FIELD OF THE INVENTION

This invention relates to a support structure designed to be advantageously installed on a bicycle or on another vehicle to support persons by means of a seat surface.

PRIOR ART

Support structures of the prior art, as represented in particular by bicycle saddles, are generally formed from a rigid or semi-rigid frame which constitutes the lower portion of the support structure and is designated by the technical term "shell," and padding which is fixed to the upper part of the shell and is preferably made of expanded elastomer material. The support structure is conventionally connected to the frame of the vehicle by appropriate fastening means that are located on the lower portion of the shell.

With particular reference to the bicycle sector, as is well known, it is necessary to construct comfortable saddles, i.e., saddles that provide a comfortable seat that allows the rider to sit comfortably on the saddle.

For this purpose, special upholstery materials made of textiles, animal skins or other materials have been designed to cover the padding, and damping devices have been interposed between the frame of the vehicle and the saddle which absorb or reduce at least some of the vibrations caused by the roughness of the ground.

To improve the comfort of the user (and in particular of the cyclist), saddles have recently been developed that use a padding consisting of a plurality of layers of materials with different elasticity (including gels), located as appropriate in the various areas of the seat surface. In these realizations of the prior art, there is an improvement in the distribution of pressures over the entire seat surface of the saddle, which improves the comfort of the cyclist, or in general of the user of the vehicle in the event that the vehicle is a motorcycle, for example, or another means of transport.

However, all these solutions, while they improve the comfort of the cyclist compared to saddles of a more conventional type, do not take sufficient account of another factor that has a significant and determining effect on the comfort of the cyclist's seat, which is the fact that the saddle becomes hot.

Numerous experimental tests have in fact shown that as a result of the action of friction due in particular to the pedaling motion of the cyclist, the seat becomes significantly hotter, and its temperature increases to the point where it is no longer very comfortable for the rider. This fact not only discourages the rider from spending extended periods of time on the saddle, but also promotes irritation and/or excessive perspiration.

Currently, as noted above, the problem of the heating of the saddle has not been solved in any satisfactory manner. Essentially, the prior art discloses two different solutions for the realization of saddles that provide the possibility of ventilation of the seat surface.

A first solution is disclosed and claimed in U.S. Pat. No. 5,356,205, in which ventilation means are present to force a flow of air through openings made in the surface of the seat of the saddle. This solution is excessively complex, time-consuming and expensive, on account of the need for numerous structural components, including a power supply system for the operation of the ventilation means. This solution also increases the weight of the saddle, not to mention the time and cost involved in the maintenance of the power supply for the ventilation means. A saddle of this type also takes a great deal of time to produce. All of these disadvantages have a negative effect on the output of the production process, which requires the assembly of the various components that form the saddle.

A second solution which attempts to provide a ventilation effect on the seat surface is disclosed and claimed in U.S. Pat. No. 4,451,083. This second solution of the prior art requires the use of a cover to be installed on top of the saddle, which provides cover with an anterior aperture that communicates with a plurality of channels and is elastically flexible so that it conforms to the seat surface.

Functionally, as is known, when the cyclist is seated on the saddle, the above referenced channels are generally closed on the extremities to create a damping action as a result of the air compressed inside them. This damping function is performed when the upper aperture of the channels is blocked by the cyclist's body, while the lower opening presses directly on the surface of the saddle. Nevertheless, the resulting ventilation action is generally not very great. In particular, the lack of conduits that are capable of transporting the air in the aperture of the cover to the openings makes this second solution of little practical benefit for the ventilation of the seat surface.

SUMMARY OF THE INVENTION

One of the objects of the present invention is to eliminate the disadvantages of the prior art described above by making available a support structure for a vehicle, in particular a bicycle, which makes it possible to affect the temperature of its seat surface and to make the support structure more comfortable.

Another object of this invention is in particular to realize a support structure that makes it possible to dissipate at least some of the heat that is generated in contact with its user.

Another object of this invention in particular, is a support structure that makes it possible to ventilate the various parts of the seat surface in a differentiated manner.

An additional object of this invention is to realize a support structure that has a simple construction and is extremely reliable in operation.

These objects and others are all achieved by the support structure of the present invention, which comprises an upper side with a seat surface and is characterized by the fact that it comprises an air intake component that is oriented at least partly in the direction of forward travel of the vehicle and at least one air distribution channel connected to the air intake means, and is provided with at least one air discharge opening to ventilate the seat surface as the vehicle moves forwardly. This invention improves the comfort of the support structure in a simple and reliable manner.

BRIEF DESCRIPTION OF THE DRAWINGS

The technical features of the present invention, in pursuit of the objects indicated above, are explained in the appended claims. Additional advantages of the invention are described in greater detail in the following Detailed Description of the Present Invention, which refers to the accompanying drawings which illustrate non-restricting embodiments of the present invention and in which:

DETAILED DESCRIPTION OF THE PRESENT INVENTION

As illustrated in the accompanying drawings, (1) represents one alternative embodiment of the support structure of the present invention. To simplify the explanation, the following description relates to a support structure that consists of a bicycle saddle, it being understood however that the support structure claimed by this invention can also be mounted on cycles of all types, as well as on motorcycles or other vehicles of all types.

The saddle (1) comprises a rigid or semi-rigid frame (2). The frame (2) constitutes the bottom portion of the saddle (1). The technical name for this component is a "shell." A flexible elastic padding (3) is installed on top of the shell (2) and is preferably made of an expanded elastomer material. For instance, the elastic padding may be anchored on the rigid or semi-rigid frame (2). The padding (3) is preferably covered by a covering made of fabric, animal skin or a suitable material capable of limiting the cyclist's perspiration.

Figure 1:
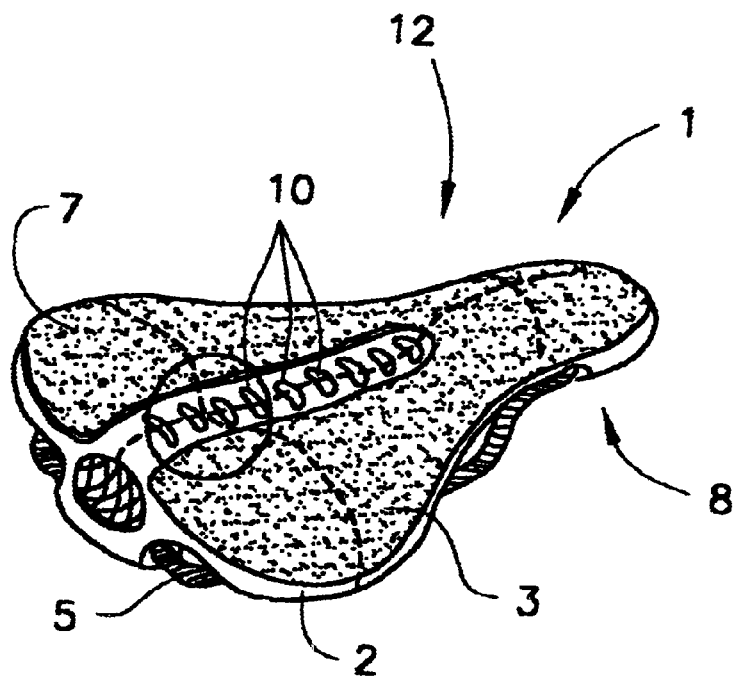
FIG. 1 Shows a perspective top view of one alternative embodiment of the present invention.
Figure 2:
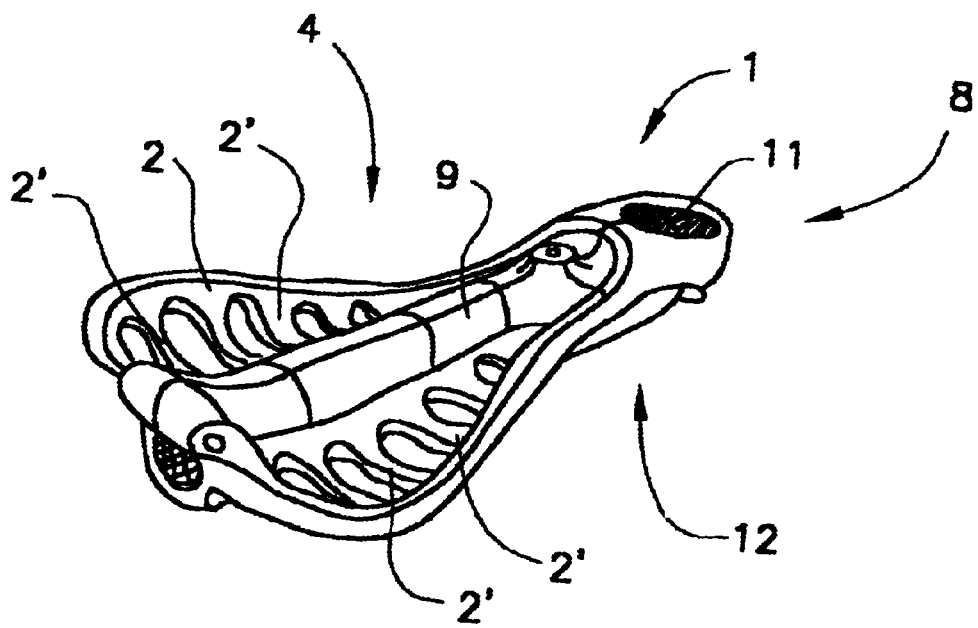
FIG. 2 Shows a perspective bottom view of the embodiment illustrated in FIG. 1.
Figure 3:
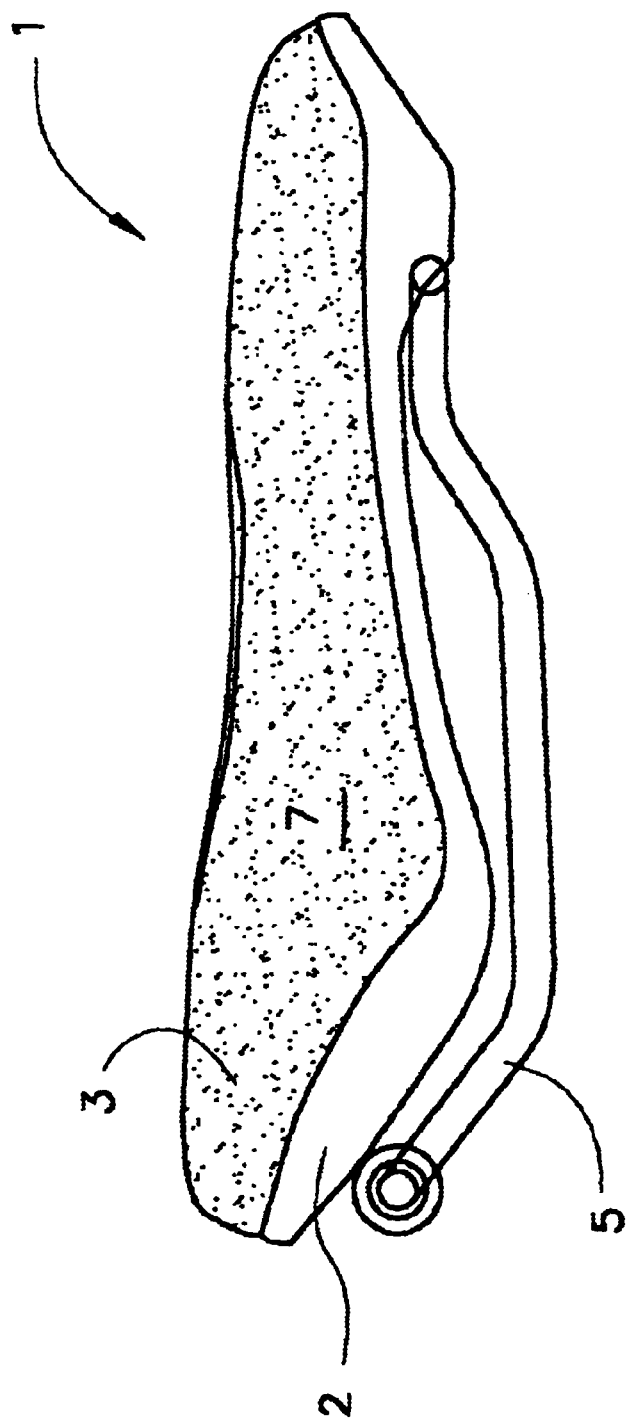
FIG. 3 Shows a side view of the embodiment illustrated in FIG. 1.
Figure 4:
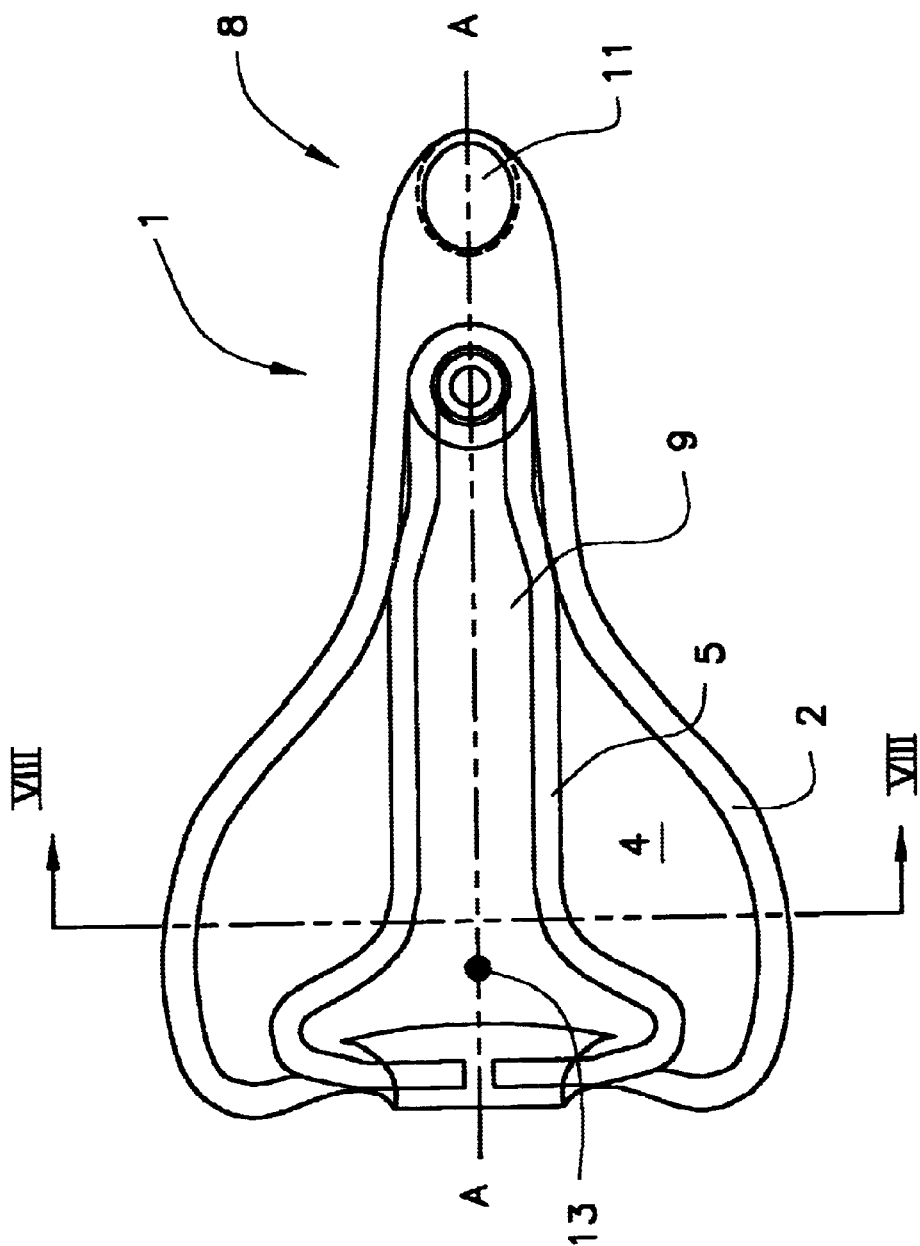
FIG. 4 Shows a bottom view of the embodiment illustrated in FIG. 1.
Figure 5:
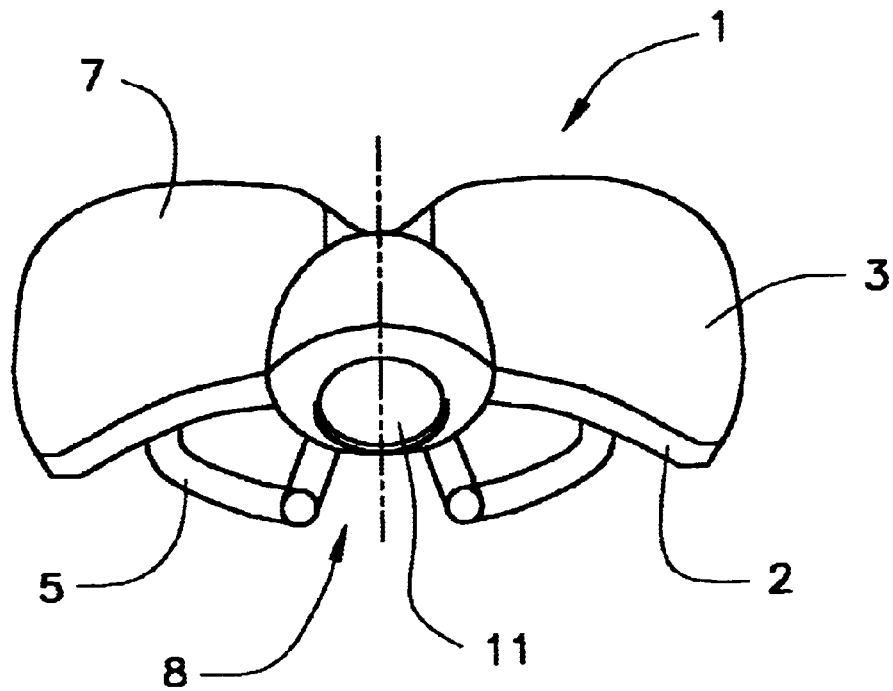
FIG. 5 Shows a front view of the embodiment illustrated in FIG. 1.
Figure 6:
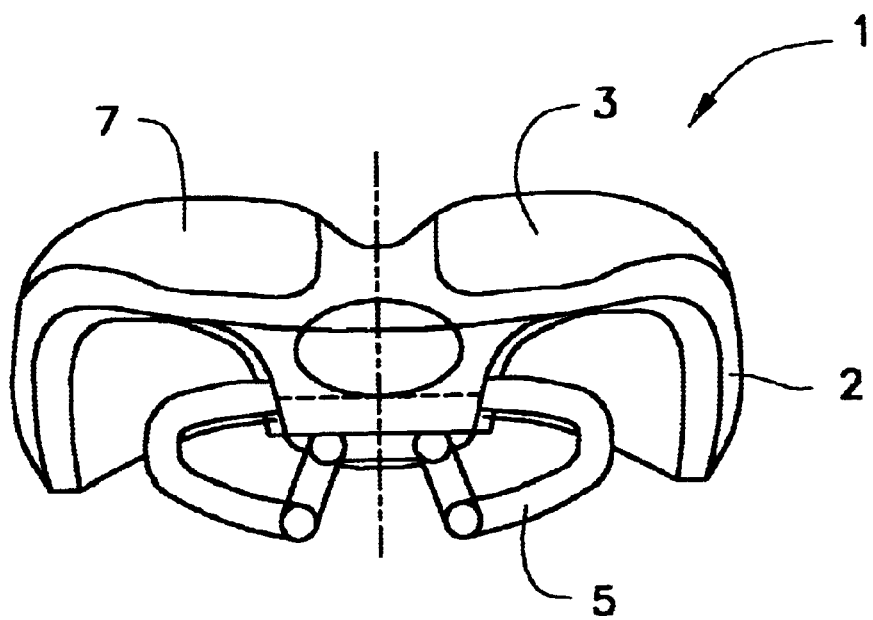
FIG. 6 Shows a rear view of the embodiment illustrated in FIG. 1.
Figure 7:
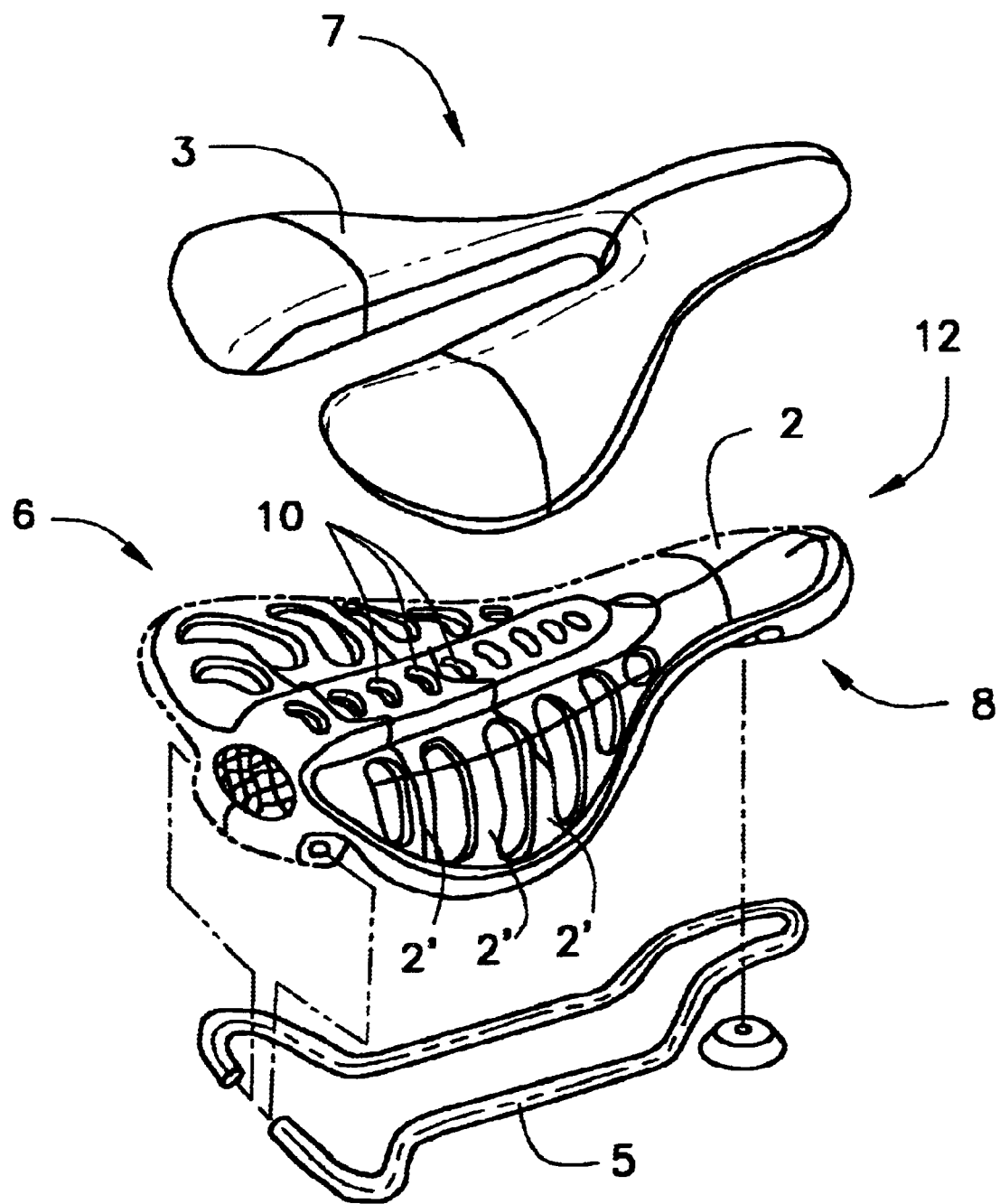
FIG. 7 Shows an exploded view, in perspective, of one embodiment of the present invention.
Figure 8:
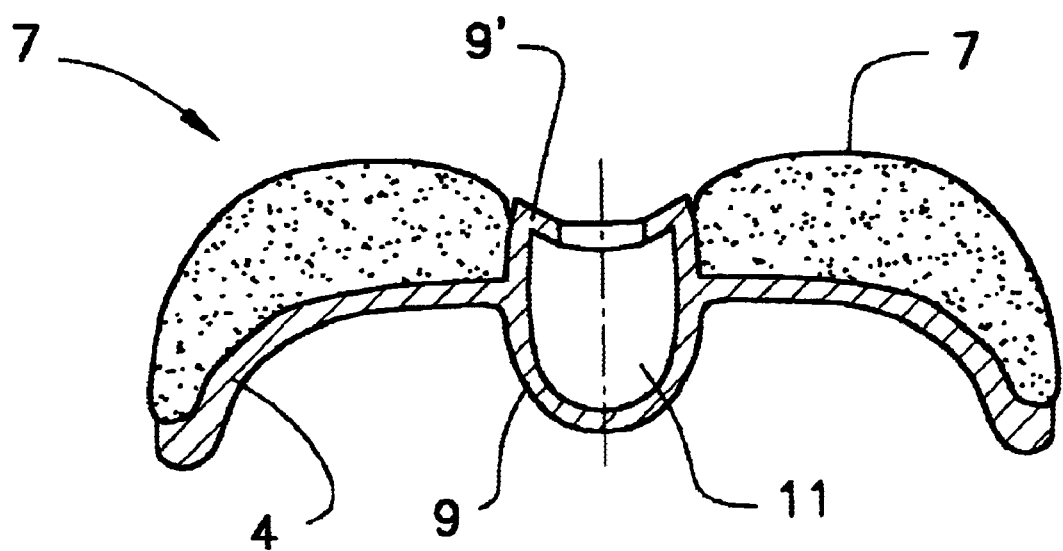
FIG. 8 Shows a cross section of the embodiment along Line VIII—VIII in FIG. 4, in which some parts have been removed to show other parts more clearly.
Figure 9:
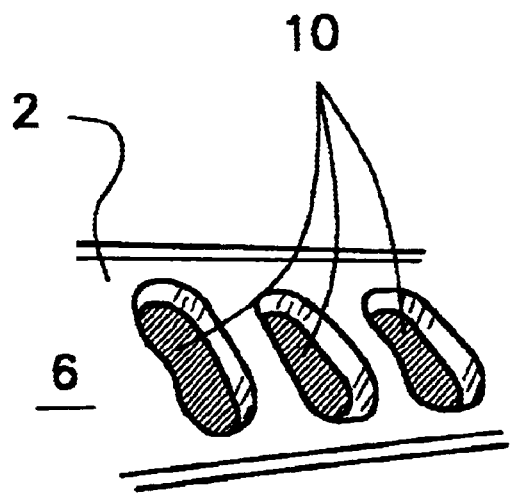
FIG. 9 Shows an enlarged detail of the embodiment illustrated in FIG. 1 relative to the openings for the expulsion of air.

With particular regard to the accompanying FIGS. 2, 4 and 7, the shell (2) has a lower surface (4) to which are attached fastening means (5) which connect the saddle (1) to a support frame of the bicycle (not shown, because it is of the same type as the prior art), and an upper surface (6), on which is fixed the padding (3), the top of which defines the seat surface (7) for the cyclist. The seat (7) surface has a front and a rear. The front of the seat surface is proximal to the front of the vehicle relative to the rear of said surface. The seat surface (7) has an upper portion and a lower portion. The lower portion encompasses the front of the seat surface (7), and the upper portion encompasses the rear of the seat surface(7).

The fastening means, which are shown only partly in the accompanying figures, are generally realized in the form of a pair of molded bars or rods (indicated as (5)) which are fixed by means of clamps to the saddle column (or seat tube).

In one preferred embodiment of the invention, the frame (2) of the saddle (1) is created by means of a plurality of ribs (2) (see FIGS. 2 and 7) which are connected to one another and simultaneously form a flexible, but rigid, lightweight framework. This structure enables the saddle to flex during use.

The invention also teaches that the support structure (1) comprises an air-intake component (8) which is essentially oriented in the direction of forward travel of the bicycle, and an air distribution channel (9) connected to the air-intake component (8) and provided with a plurality of air discharge openings (10) to ventilate the seat surface (7).

The distribution channel (9) may be advantageously formed inside the frame (2), thereby forming a single piece with the frame (2). It can be manufactured, for example, in a stamping process by the fusion of plastic material in a single stamping action. Alternatively, the distribution channel (9) may also be a separate element which can be rigidly fastened to the frame (2) by means of appropriate fastening means.

In detail, the air-intake component (8) described above consist of an aperture (11) made in an anterior portion (12) of the frame (2). Said air-intake component may also comprise more than one aperture (11).

To obtain an appropriate ventilation of the seat surface (7), the air discharge openings (10) are advantageously distributed over the seat surface (7), and for this purpose are predominantly, as necessary, in an upper portion of the seat surface. In other words, the distribution of the openings (10) is designed to allow differentiated aeration of the different parts of the seat surface (7) to obtain a very cool and comfortable saddle (1) for the cyclist. For this purpose, the openings (10) can also be given different dimensions to take into consideration the different air flows that are to be routed to the different zones of the seat surface (7) and to take into account the loss of pressure that occurs gradually the farther the air travels from aperture (11). Also, the air discharge openings (10) may be located on said distribution channel (9) in positions where they provide differentiated aeration of the different parts of said seat surface (7).

To transport the ventilated air into various desired areas of the seat surface (7) of the saddle (1), there can also be one or more secondary conduits connected to the distribution channel (9), and they can also be provided with one or more air discharge openings (10).

The distribution channel (9) is preferably located along the longitudinal center plane of symmetry A—A of the saddle (1) (See FIG. 4) and extends essentially over the entire length of the support structure (2). The distribution channel (9) can also advantageously be provided with a water discharge component (13) to evacuate the water that may penetrate via the air-intake component (8).

In another embodiment of the present invention, the support structure is symmetrical with respect to a longitudinal center plane (A—A) in FIG. 4, whereby said distribution channel (9) is located along said plane, extending essentially along the entire length of the support structure (2). The longitudinal center plane (A—A) extends through the lower portion of the seat surface to the rear portion thereof, thus defining two substantially symmetrical halves of the seat surface.

In another embodiment of the present invention, the support structure (1) has a slot on the top of the seat surface (See FIGS. 2,5,6 and 8). The slot extends down the center of the seat surface along the longitudinal center plane (A—A) in FIG. 4. At least one air discharge opening (10) may be dispersed within the slot. While the vehicle moves forward, air flows through the at least one aperture (11) of the air intake component (8), through the at least one air discharge opening (10) disposed within the slot and then through and along the slot toward the upper portion of the seat surface.

The present invention has been described in connection with the embodiments described herein. However, the practical realization of the present invention can also assume forms and configurations different from the embodiments described herein, without thereby going beyond the scope of the appended claims. In particular, technical equivalent elements can be substituted, and the dimensions, shapes and materials used can be whatever is necessary for the specific application. Thus, it will be understood that the present invention is capable of further modification, and this application, including the appended claims, are intended to cover any variations, uses, or adaptations of the present invention following, in general, the principles of the present disclosures set forth herein and including such departures from the present disclosures that come within the known or customary practice in the art to which the invention pertains.

We claim:

1. A ventilated support structure for a vehicle, comprising:
   (a) a seat surface on top of which a rider sits; the seat surface having a front and a rear; the front of the seat surface being proximal to the front of the vehicle relative to the rear of the seat surface;
   (b) the seat surface having a lower portion and an upper portion; the lower portion encompassing the front of the seat surface; the upper portion encompassing the rear of the seat surface;
   (c) a longitudinal center plane extends through the lower portion of the seat surface to the upper portion thereof, thus defining two substantially symmetrical halves of the seat surface;
   (d) a slot being positioned on top of the seat surface; the slot extends down the center of the seat surface along the longitudinal center plane and over at least part of the upper portion of said surface; at least one air discharge opening being disposed within the slot;
   (e) an air distribution channel having a first portion and a second portion; the air distribution channel being positioned beneath the seat surface;
   (f) said first portion of the air distribution channel having an air intake component for directing air flow into the air distribution channel; said air in take component comprising at least one aperture for introducing air through the air intake component;
   (g) said second portion of the air distribution channel being engaged with at least one air discharge opening to enable air to flow through the at least one aperture of the air intake component and through the at least one air discharge opening disposed within the slot on top of the seat surface; and
   (h) wherein the seat surface is supported on a rigid frame, and the rigid frame comprises a series of interconnected ribs.

2. The ventilated support structure of claim 1, wherein the air distribution channel is attached to the rigid frame member.

3. The ventilated support structure of claim 1, wherein the seat surface has a plurality of air discharge openings disposed within the slot.

4. The ventilated support structure of claim 3, wherein the plurality of air-discharge openings are positioned in different areas of the seat surface; the air distribution channel is engaged with the plurality of air-discharge openings to permit air to flow through the plurality of air-discharge openings.

5. The ventilated support structure of claim 3, wherein the dimensions of the air-discharge openings differ from one to another.

6. The ventilated support structure of claim 1, wherein the second portion of the air distribution channel is connected to more than one air discharge opening.

7. The ventilated support structure of claim 1, wherein the air-distribution channel extends the longitudinal center plane essentially over the entire length of the support structure.

8. The ventilated support structure of claim 1, wherein the air distribution channel comprises a water discharge component for evacuating water entering into the air-intake component.

9. The ventilated support structure of claim 1, wherein the air-distribution channel is inside the rigid frame.

10. The ventilated support structure of claim 1, wherein the air-intake component comprises a plurality of apertures.

11. The ventilated support structure of claim 1, wherein the air-distribution channel being integrally formed with the rigid frame.

12. The ventilated support structure of claim 1, wherein said support structure comprises at least one secondary conduit connecting the air-distribution channel to at least one air discharge opening.

13. The ventilated support structure of claim 1, wherein the at least one air-discharge opening being located in the upper portion of the seat surface.

* * * * *